(12) United States Patent
Buhr

(10) Patent No.: US 11,389,877 B2
(45) Date of Patent: Jul. 19, 2022

(54) SCANFIELD ALIGNMENT OF MULTIPLE OPTICAL SYSTEMS

(71) Applicant: General Electric Company, Schenectady, NY (US)

(72) Inventor: Nicholas Edward Buhr, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 176 days.

(21) Appl. No.: 16/703,292

(22) Filed: Dec. 4, 2019

(65) Prior Publication Data

US 2021/0170484 A1    Jun. 10, 2021

(51) Int. Cl.
| | | |
|---|---|---|
| B22F 10/00 | (2021.01) | |
| B22F 10/10 | (2021.01) | |
| B29C 64/153 | (2017.01) | |
| B33Y 10/00 | (2015.01) | |

(52) U.S. Cl.
CPC ............ B22F 10/00 (2021.01); B29C 64/153 (2017.08); B22F 10/10 (2021.01); B33Y 10/00 (2014.12)

(58) Field of Classification Search
CPC ........ B22F 10/00; B22F 10/10; B29C 64/153; B33Y 10/00
See application file for complete search history.

(56) References Cited

U.S. PATENT DOCUMENTS

| | | | |
|---|---|---|---|
| 5,661,667 A | 8/1997 | Rueb et al. | |
| 9,091,530 B1 | 7/2015 | Ashford et al. | |
| 9,724,876 B2 | 8/2017 | Cheverton et al. | |
| 9,774,837 B2 | 9/2017 | Chang et al. | |
| 2014/0180620 A1 | 6/2014 | Hicks | |
| 2018/0144503 A1 | 5/2018 | Hamadou et al. | |
| 2018/0255630 A1 | 9/2018 | Wu et al. | |
| 2018/0370146 A1 | 12/2018 | Domrose et al. | |
| 2019/0118481 A1* | 4/2019 | Brown | B22F 10/30 |

FOREIGN PATENT DOCUMENTS

| | | |
|---|---|---|
| EP | 3722079 A1 | 10/2020 |
| WO | 2018122696 A1 | 7/2018 |
| WO | 2019158394 A1 | 8/2019 |
| WO | 2019161886 A1 | 8/2019 |

OTHER PUBLICATIONS

Extended European Search Report for EP Application No. 20209165.8 dated Apr. 7, 2021 (9 pages).
Japanese Patent Application No. 2020-200503 Office Action, dated Sep. 17, 2021 (5 pages with English Translation).

\* cited by examiner

*Primary Examiner* — Michael P Wieczorek
(74) *Attorney, Agent, or Firm* — Dinsmore & Shohl LLP

(57) ABSTRACT

A method for calibrating beam scan fields for an additive manufacturing process in which two or more radiant energy beams are used to selectively melt material to form a workpiece. The method includes: directing the two or more radiant energy beams using individual beam steering mechanisms to create a calibration build pattern on a substrate, the calibration build pattern including at least one measurement artifact created by each of the two or more radiant energy beams; measuring the position of the measurement artifacts; comparing the position of the measurement artifacts to a standard to identify an alignment error; and adjusting at least one of the beam steering mechanisms to compensate for the alignment error.

19 Claims, 4 Drawing Sheets

SCANFIELD ALIGNMENT OF MULTIPLE OPTICAL SYSTEMS

BACKGROUND OF THE INVENTION

This invention relates generally to additive manufacturing, and more particularly to apparatus and methods for alignment of energy beams in additive manufacturing.

Additive manufacturing is a process in which material is built up layer-by-layer to form a component. Additive manufacturing is also referred to by terms such as "layered manufacturing," and "reverse machining." Such terms are treated as synonyms for purposes of the present invention.

One type of additive manufacturing machine is referred to as a "powder bed" or Direct Metal Laser Melting ("DMLM") machine and includes a build chamber that encloses a mass of powder that is selectively fused by a radiant energy beam to form a workpiece. This type of machine may be provided with multiple optical systems or beam generators that produce multiple radiant energy beams (e.g., lasers) to speed the build process. Each beam is capable of being swept over its own independent scan field. Calibration and relative alignment of the independent scan fields is critical for achieving quality parts in multi-beam additive manufacturing machines.

One problem with prior calibration processes is that they do not allow direct comparison of the alignments of multiple optical systems.

BRIEF DESCRIPTION OF THE INVENTION

This problem is addressed by the use of a calibration build pattern including measurement artifacts created by different optical systems.

According to one aspect of the technology described herein, a method is provided for calibrating beam scan fields for an additive manufacturing process in which two or more radiant energy beams are used to selectively melt material to form a workpiece. The method includes: directing the two or more radiant energy beams using individual beam steering mechanisms to create a calibration build pattern on a substrate, the calibration build pattern including at least one measurement artifact created by each of the two or more radiant energy beams; measuring the position of the measurement artifacts; comparing the position of the measurement artifacts to a standard to identify whether an alignment error is present; and if an alignment error is present, adjusting at least one of the beam steering mechanisms to compensate for the alignment error.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
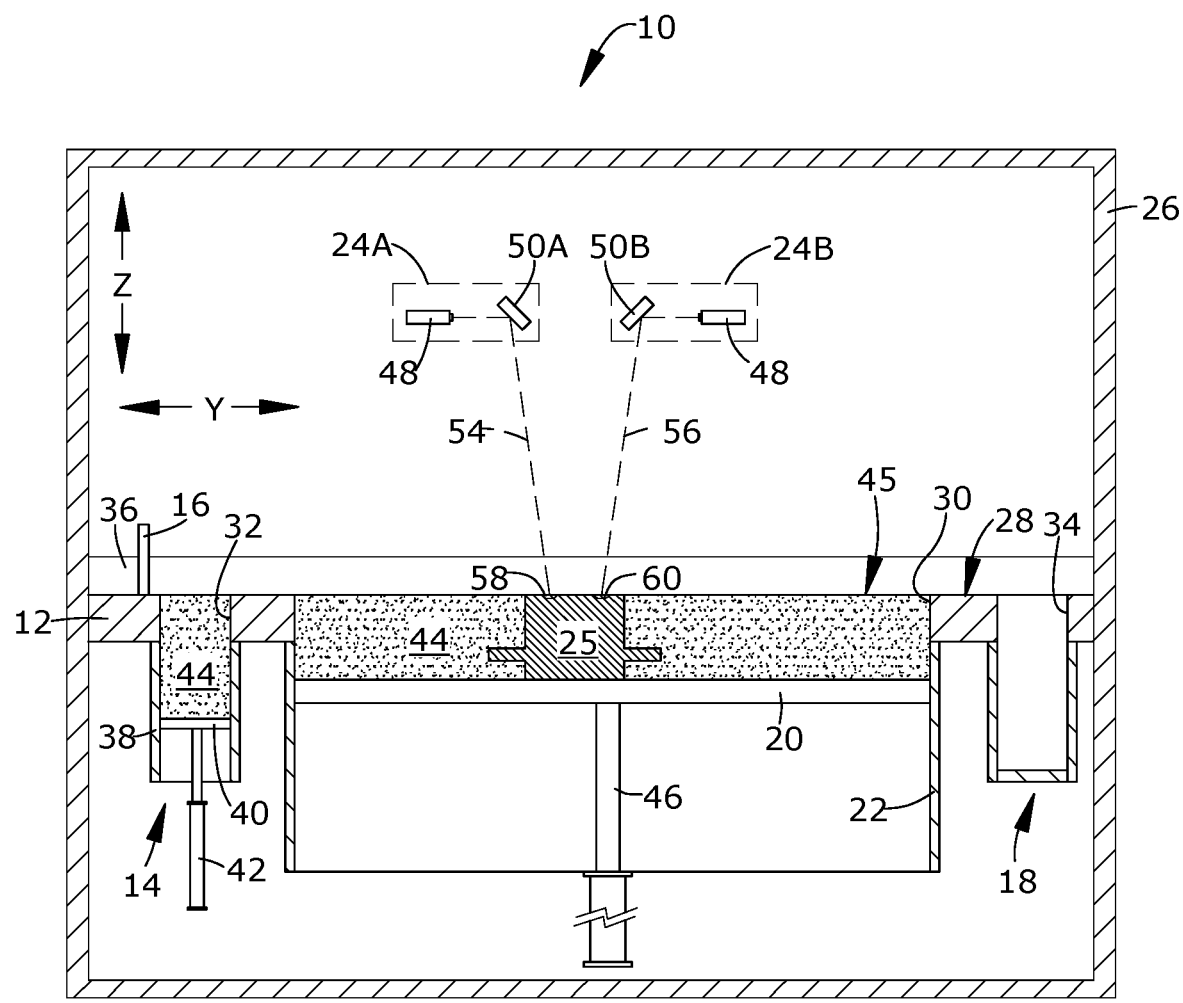
FIG. 1 is a schematic, partially-sectioned front elevation view of an exemplary additive manufacturing machine including a build chamber therein.

Referring to the drawings wherein identical reference numerals denote the same elements throughout the various views, FIG. 1 illustrates schematically an additive manufacturing machine 10 suitable for carrying out an additive manufacturing method. The machine 10 and its operation are as representative example of a "powder bed machine".

It will be understood that the machine 10 is merely used as an example to provide context for describing the principles of the present invention. The principles described herein are applicable to other configurations of powder bed machines, as well as to other types of additive manufacturing machines and related processes. More generally, the principles described herein would be applicable to any manufacturing process in which a melt pool is generated. Nonlimiting examples of such processes include electron-beam melting ("EBM"), directed energy deposition ("DED"), and laser welding. The term "manufacturing process" could also encompass repair processes where components are built up or joined together using a technique that generates a melt pool.

Basic components of the machine 10 include a table 12, a powder supply 14, a recoater 16, an overflow container 18, a build platform 20 surrounded by a build chamber 22, and at least one beam generator (denoted 24 generally), all surrounded by a housing 26. Each of these components will be described in more detail below.

The table 12 is a rigid structure defining a planar worksurface 28. The worksurface 28 is coplanar with and defines a virtual workplane. In the illustrated example it includes a build opening 30 communicating with the build chamber 22 and exposing the build platform 20, a supply opening 32 communicating with the powder supply 14, and an overflow opening 34 communicating with the overflow container 18.

The recoater 16 is a rigid, laterally-elongated structure that lies on the worksurface 28. It is connected to an actuator 36 operable to selectively move the recoater 16 along the worksurface 28. The actuator 36 is depicted schematically in FIG. 1, with the understanding that devices such as pneumatic or hydraulic cylinders, ballscrew or linear electric actuators, and so forth, may be used for this purpose.

The powder supply 14 comprises a supply container 38 underlying and communicating with the supply opening 32, and an elevator 40. The elevator 40 is a plate-like structure that is vertically slidable within the supply container 38. It is connected to an actuator 42 operable to selectively move the elevator 40 up or down. The actuator 42 is depicted schematically in FIG. 1, with the understanding that devices such as pneumatic or hydraulic cylinders, ballscrew or linear electric actuators, and so forth, may be used for this purpose. When the elevator 40 is lowered, a supply of powder 44 of a desired composition (for example, metallic, polymeric, ceramic, and/or organic powder) may be loaded into the supply container 38. When the elevator 40 is raised, it exposes the powder 44 above the worksurface 28. Other types of powder supplies may be used; for example, powder may be dropped into the build chamber 22 by an overhead device (not shown).

The build platform 20 is a plate-like structure that is vertically slidable below the build opening 30. It is connected to an actuator 46 operable to selectively move the build platform 20 up or down. The actuator 46 is depicted schematically in FIG. 1, with the understanding that devices such as pneumatic or hydraulic cylinders, ballscrew or linear electric actuators, and so forth, may be used for this purpose. When the build platform 20 is lowered into the build chamber 22 during a build process, the build chamber 22 and the build platform 20 collectively surround and support a mass of powder 44 along with any components being built. This mass of powder is generally referred to as a "powder bed", and this specific category of additive manufacturing process may be referred to as a "powder bed process".

The overflow container 18 underlies and communicates with the overflow opening 34, and serves as a repository for excess powder 44.

The apparatus 10 incorporates two or more beam generators operable to generate an energy beam and direct it as desired. As will be explained in more detail below, any number of beam generators 24 may be provided and used simultaneously to increase the production speed of the apparatus 10. In the illustrated example, two beam generators 24A, 24B are shown.

Each beam generator 24A, 24B, includes a directed energy source 48 and a beam steering mechanism (referred to at 50 generally). The individual beam steering mechanisms are denoted 50A, 50B respectively. The directed energy source 48 may comprise any device operable to generate a beam of suitable power and other operating characteristics to melt and fuse the powder 44 during the build process, described in more detail below. For example, the directed energy source 48 may be a laser. Other directed-energy sources such as electron beam guns are suitable alternatives to a laser.

Each beam steering mechanism 50A, 50B may include one or more mirrors, prisms, and/or lenses, and may be provided with suitable actuators and arranged so that a beam from the directed energy source 48 can be focused to a desired spot size and steered to a desired position in plane coincident with the worksurface 28. For purposes of convenient description, this plane may be referred to as a X-Y plane, and a direction perpendicular to the X-Y plane is denoted as a Z-direction (X, Y, and Z being three mutually perpendicular directions). The beam may be referred to herein as a "build beam".

One known type of beam steering mechanism incorporates two mirrors that sequentially receive a build beam and redirect it to a desired focal spot. Each mirror is connected to and selectively pivoted by its own galvanometer, commonly referred to as a "galvo". This type of beam steering mechanism receives independent inputs or drive signals (e.g., variable voltage signals) for beam sweep or beam pointing in two mutually perpendicular planes. For example, one galvo may pivot the beam in a X-Z plane, resulting in the beam focal spot moving in the X-direction on the worksurface 28. The other galvo may pivot the beam in a Y-Z plane, resulting in the beam focal spot moving in the Y-direction on the worksurface 28. The sum of the two motions produces a desired movement of the beam focal spot to any X-Y position on the worksurface 28. The beam steering mechanisms 50A, 50B and their operation are discussed in greater detail below.

The housing 26 serves to isolate and protect the other components of the machine 10. During a build process, the housing 26 is provided with a flow of an appropriate shielding gas which, among other functions, excludes oxygen from the build environment. The composition of the gas used may be similar to that used as shielding gas for conventional welding operations. For example, gases such as nitrogen, argon, or mixtures thereof may be used. Any convenient source of gas may be used, such as a nitrogen generator or more pressurized gas cylinders.

The operation of the machine 10 may be controlled, for example, by software running on one or more processors embodied in one or more devices referred to as a "controller", such as a programmable logic controller ("PLC") or a microcomputer (not shown). Such processors may be coupled to the sensors and operating components, for example, through wired or wireless connections. The same processor or processors may be used to retrieve and analyze sensor data, for statistical analysis, and for feedback control.

An exemplary basic build process for a workpiece 25 using the apparatus described above is as follows. The build platform 20 is positioned below the worksurface 28 by a selected layer increment. The layer increment affects the speed of the additive manufacturing process and the resolution of the workpiece 25. As an example, the layer increment may be about 10 to 50 micrometers (0.0003 to 0.002 in.). Powder 44 is then deposited over the build platform 20. For example, the elevator 40 of the supply container 38 may be raised to push powder through the supply opening 32, exposing it above the worksurface 28. The recoater 16 is moved across the worksurface 28 to spread the raised powder 44 horizontally over the build platform 20. Any excess powder 44 drops through the overflow opening 34 into the overflow container 18 as the recoater 16 passes from left to right. Subsequently, the recoater 16 may be moved back to a starting position. The leveled powder 44 may be referred to as a "build layer" and the exposed upper surface thereof may be referred to as a "build surface", designated 45.

The beam generators 24A, 24B are used to melt a two-dimensional cross-section or layer of the workpiece 25 being built. Within each beam generator 24A, 24B, the directed energy source 48 emits a beam and the respective beam steering mechanism 50A, 50B is used to steer a focal spot of the corresponding build beam 54, 56 over the exposed powder surface in an appropriate pattern. A small portion of the exposed layer of the powder 44 surrounding the focal spot, referred to herein as a "melt pool" is heated by the build beam to a temperature allowing it to sinter or melt, flow, and consolidate. This step may be referred to as "fusing" the powder 44. As an example, the melt pool may be on the order of 100 micrometers (0.004 in.) wide. In the illustrated example using two beam generators 24A, 24B the first build beam 54 generates a first melt pool 58 and the second build beam 56 generates a second melt pool 60.

The build platform 20 is then moved vertically downward by the layer increment, and another layer of powder 44 is applied in a similar thickness. The beam generators 24A, 24B again emit build beams 54, 56 and the beam steering mechanisms 50A, 50B are used to steer the focal spots of the build beams 54, 56 over the exposed powder surface in an appropriate pattern. The exposed layer of the powder 44 is heated by the build beams 54, 56 to a temperature allowing it to fuse as described above, and consolidate both within the top layer and with the lower, previously-solidified layer.

This cycle of moving the build platform 20, applying powder 44, and then directed energy fusing the powder 44 is repeated until the entire workpiece 25 is complete.

As noted above, the machine 10 and its operation are a representative example of a "powder bed machine". It will be understood that the principles described here are applicable to other configurations of powder bed machines, as well as to other types of additive manufacturing machines. Furthermore, the principles described herein are applicable to any machine or device having two or more independently-steerable directed energy beams having scan fields that must be aligned relative each other.

Figure 2:
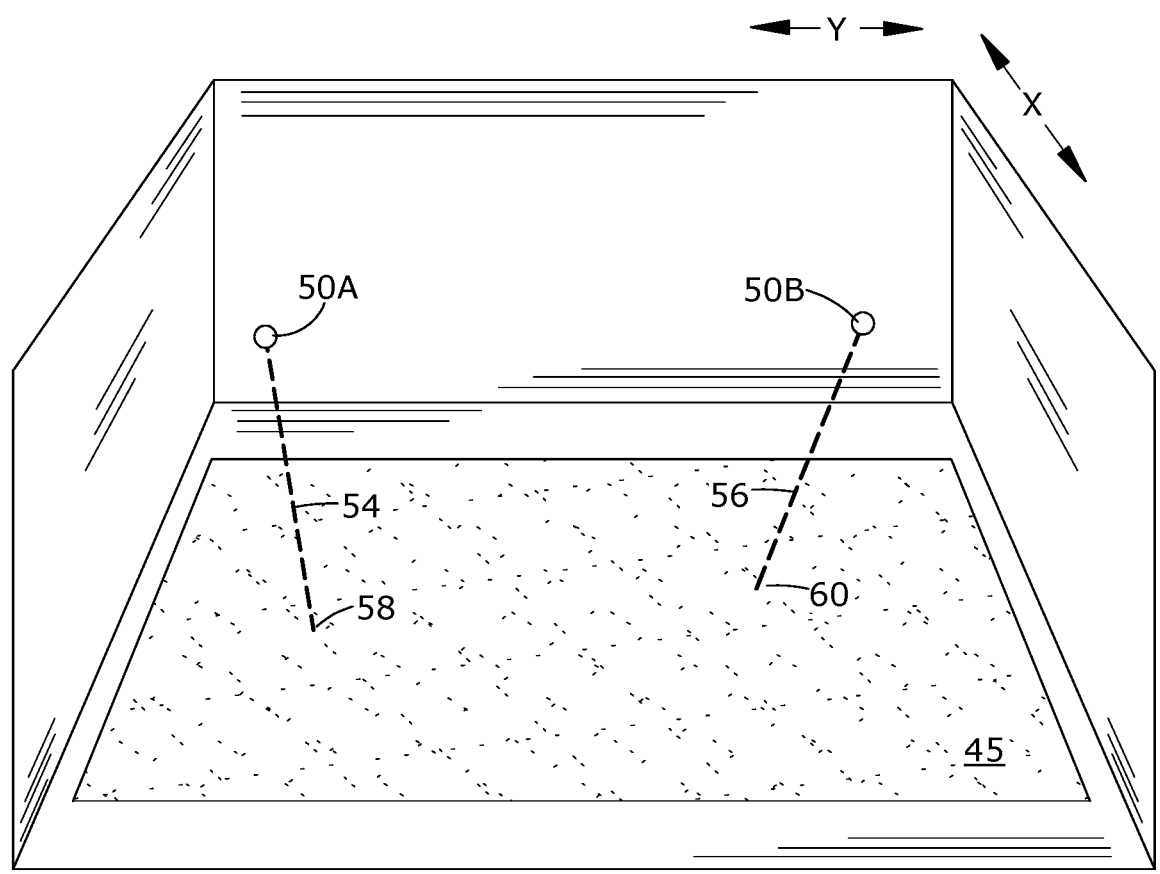
FIG. 2 is a schematic, perspective view of the machine of FIG. 1.

Considering the beam generators 24A, 24B in more detail, it will be understood that each beam generator 24A, 24B occupies a definite physical volume and that for the first and second build beams 54, 56 to be independently steerable, an independent beam steering mechanism must be provided. This has the result that the build beams 54 and 56 necessarily originate from different physical locations above the worksurface 28. In the example illustrated in FIG. 2, the first beam steering mechanism 50A and the second beam steering mechanism 50B are located along a common line in the Y-direction and are spaced apart from each other.

Prior to operation of the machine 10 to build a workpiece 25 using the process described above, it is necessary to calibrate and align the scan fields of the beam generators 24A, 24B. Typically, the physical range of motion of each beam steering mechanism 50A, 50B in each axis is sufficient that the build beam can sweep out a range greater than the size of the worksurface 28. Thus, "calibration" or "adjustment" of an individual galvo may typically be effected by changing the at least one parameter of a software transfer function that determines the value of a drive signal delivered to each galvo. In addition to, or as an alternative to, software adjustment, a mechanical adjustment may be provided.

Figure 3:
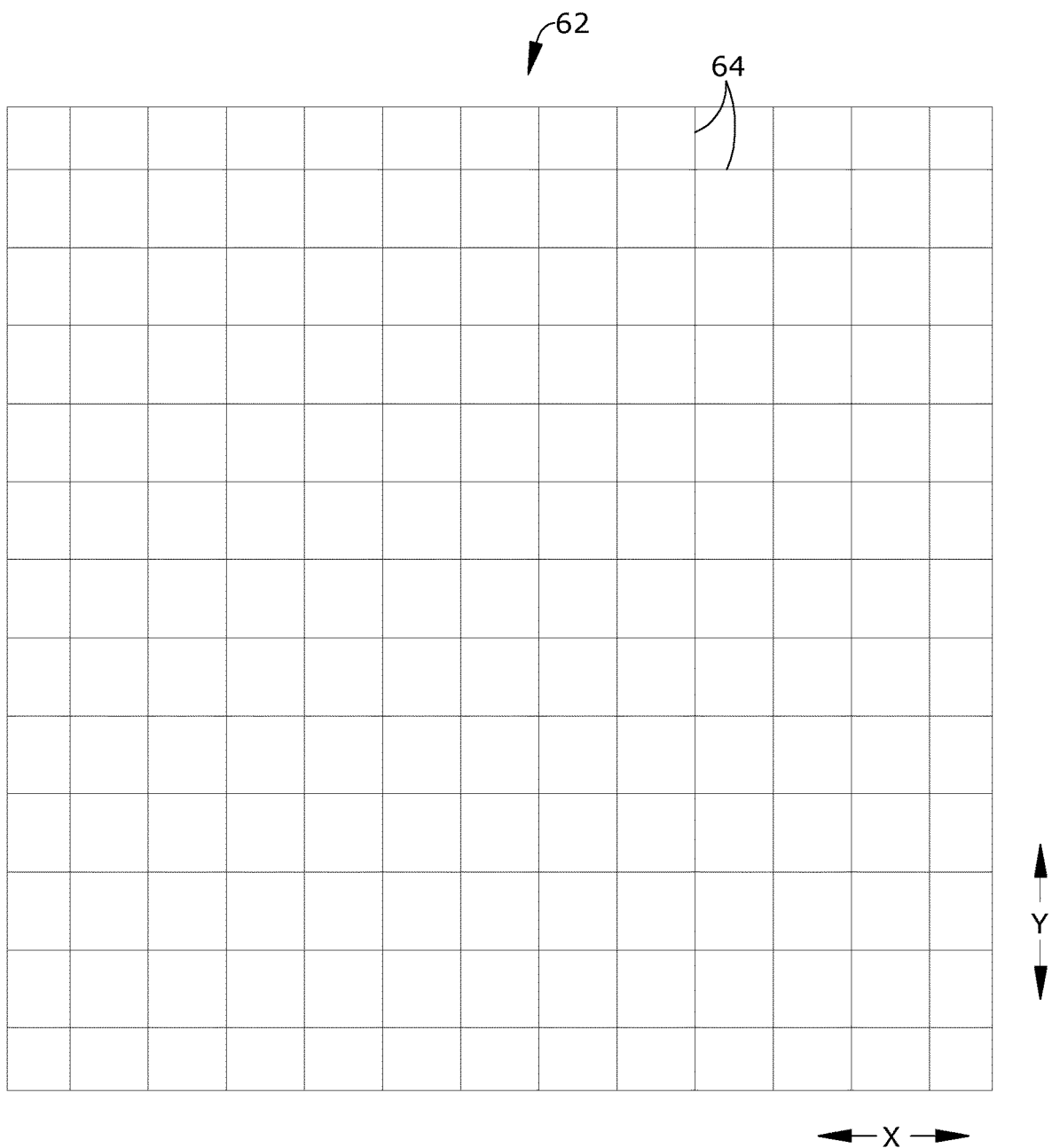
FIG. 3 is a schematic top plan view of a prior art beam calibration build pattern.

In the prior art, it is typical to calibrate and align the scan fields of multi-beam machines by first generating measurement artifacts (e.g., by using the build beam to burn a pattern on paper or a similar substrate, or to use the beam generators 24 to produce a pattern of weld beads on an anodized metal plate, or to create a single-layer test build of fused powder). One test pattern or set of measurement artifacts is created by each beam generator 24. FIG. 3 shows an example of a conventional test pattern 62 comprising a grid of parallel lines 64.

Each of the individual test patterns 62 is then scanned with an appropriate device, such as an optical coordinate measuring machine, to produce a set of measurements. The set of measurements may be evaluated to determine the positional accuracy of the beam generator 24A, 24B, e.g., by measuring distances between gridlines 64 in the grid pattern 62. The gridlines 64 may also be measured to determine their accuracy in position and rotation. The corresponding beam generator 24A, 24B is then adjusted to compensate for the error in position and rotation. In this process, the total scan field location is measured and adjusted as a single entity. For example, if the scan field position is measured as being 0.1 mm to the left of a desired position, the corresponding beam generator 24A, 24B would be adjusted to bring the entire scan field 0.1 mm to the right.

The intended result is that when each of the plurality of beam generators 24A, 24B is aligned to a nominal or desired position, the multiple scan fields will be mutually aligned or calibrated.

It has been found that quality of the alignment process may be improved over the prior art process described above by using a calibration build job that includes artifacts created by multiple beam generators 24A, 24B.

Figure 4:
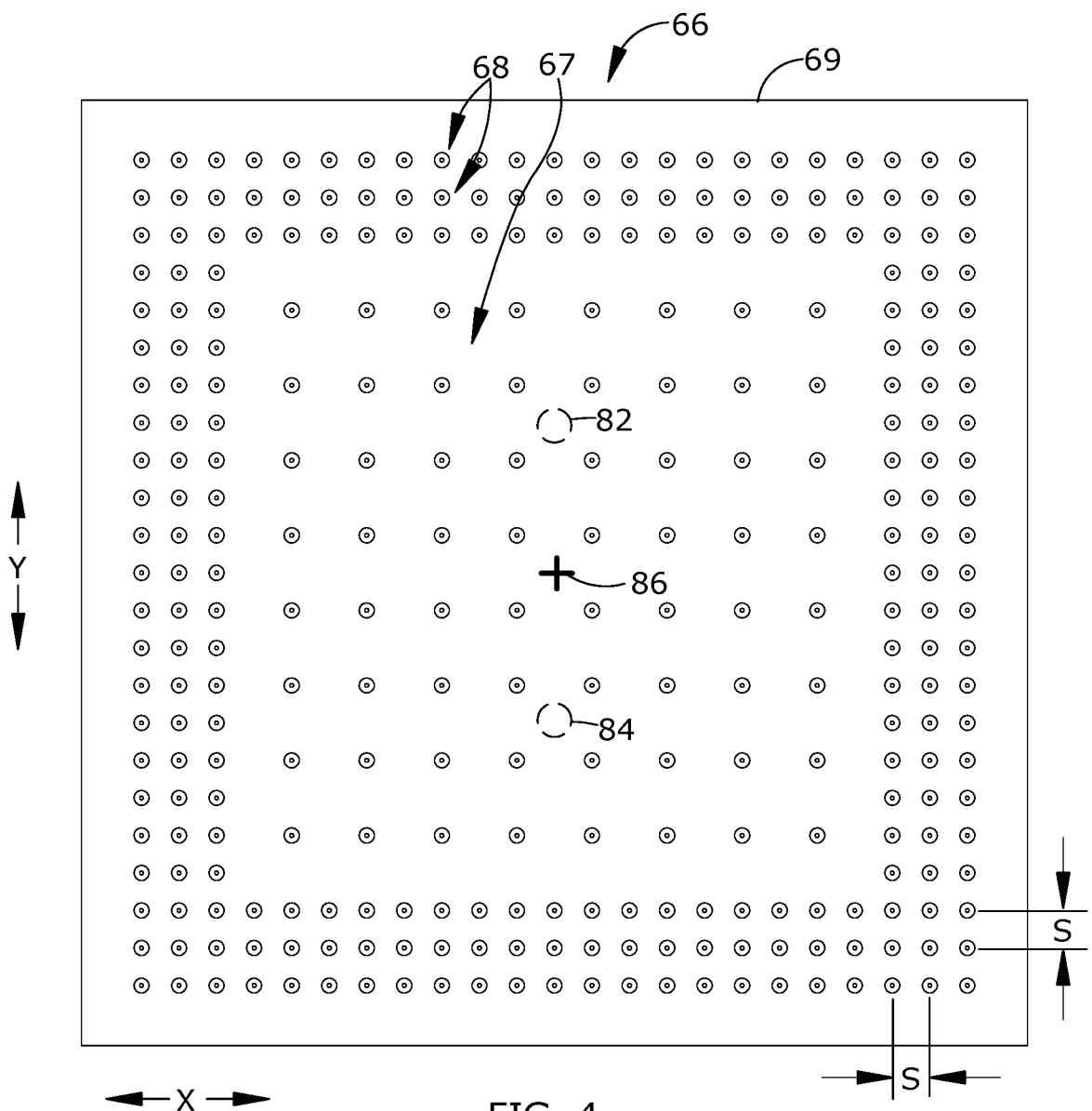
FIG. 4 is a schematic top plan view of an exemplary beam calibration build pattern in accordance with an aspect of the present invention.

FIG. 4 illustrates a representative calibration build job or calibration build pattern 66 comprising one or more measurement artifact groups 68 each including two or more measurement artifacts. Within the measurement artifact group 68, at least one measurement artifact is created by each one of the beam generators 24A, 24B. The calibration build pattern 66 may be described as having a central area 67 surrounded by a boundary 69.

Figure 5:
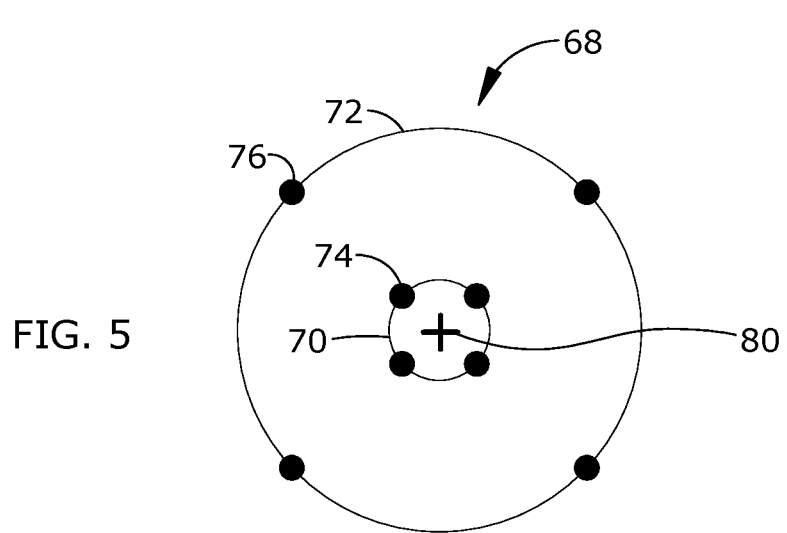
FIG. 5 is an enlarged view of a portion of the build calibration pattern of FIG. 4.

In the illustrated example, as best seen in FIG. 5, each of the measurement artifact groups 68 comprises a first measurement artifact 70 formed by the first beam generator 24A, and a second measurement artifact 72 formed by the second beam generator 24B.

The measurement artifacts 70, 72 are arranged in a predetermined pattern which permits measurement and evaluation of positional error over a specific area, such as the worksurface 28.

In the illustrated example, this predetermined pattern comprises a two-dimensional array of concentric circle pairs. Numerous other shapes and sizes of measurement artifacts may be used, including but not limited to points, lines, hashmarks, polygons, or open or closed curves, so long as they may be readily identified for measurement.

The calibration build pattern 66 is employed by first generating measurement artifacts 70, 72 (e.g., by using the build beams 54, 56 to burn a pattern on paper or similar substrate, or to use the build beams 54, 56 to run a pattern of weld beads on an anodized metal plate, or to create a single-layer test build of fused powder). Within the calibration build pattern 66, the first beam generator 24A is used to form the first measurement artifacts 70, and the second beam generator 24B is used to form the second measurement artifacts 72.

The single calibration build pattern 66 is then scanned with an appropriate device such as an optical coordinate measuring machine to produce a set of measurements. One example of a possible set of measurements would be a set of points (FIG. 5) including first points 74 lying on the first measurement artifacts 70, and second points 76 lying on the second measurement artifacts 72. The set of measurements may be evaluated to determine the positional accuracy of the beam steering mechanisms 50A, 50B.

For example, the set of points may be evaluated to determine the position or distance error of each beam steering mechanism 50A, 50B relative to a local control point 80, as well as the relative alignment of the beam steering mechanisms 50A, 50B to each other at each control point 80.

The calibration build pattern 66 may be configured to accommodate the specific physical and operational characteristics of the beam generators 24, or other aspects of the machine 10.

For example, it is a characteristic of each beam steering mechanisms 50A, 50B to have a greater accuracy near the center of its scan field, with increased error near the limits of its scan field in either axis. This may be accommodated by using a variable spacing of the measurement artifact groups 68 as seen in FIG. 4, where a spacing "S" is closer at regions of higher error such as the scan field margins. For example, the spacing S may be closer near the boundary 69 than in a central area 67. This feature improves measurement resolution without unnecessarily increasing the time required to scan the entire test build 66.

Furthermore, because the beam steering mechanisms 50A, 50B are not co-located, their scan fields are partially overlapping and their individual scan field centers (82, 84 respectively) are not coincident with a physical center 86 of the worksurface 28. The calibration build pattern 66 may be modified to accommodate this fact, for example by including more dense or close spacing of the measurement artifact groups 68 in regions representing the boundary of the scan field of an individual beam steering mechanism 50A, 50B.

The use of multiple control points 80 permits the optimization of the beam steering mechanism calibration to minimize the average error over the scan field, or to minimize the error at a selected control point 80 or set of control points at a selected location within the worksurface 28. For example, a predetermined region within a worksurface 28 may coincide with a portion of a workpiece 25 requiring higher positional accuracy. The calibration build pattern 66 could be modified by including relatively closer spacing within that predetermined region (not shown).

In general, the calibration build pattern 66 is employed by obtaining the set of measurements described above, comparing the set of measurements to a predetermined standard, identifying an alignment error of at least one of the beam steering mechanisms 50A, 50B based on the difference between the measurements and standard, and then correcting for the error by adjusting one or more of the beam steering mechanisms 50A, 50B. It is noted that adjustment of the beam steering mechanisms 50A, 50B can include adjustments which are varying within the physical range of motion of each beam steering mechanism 50A, 50B. Stated another way, there need not be a single calibration for the entire beam scan field. For example, the transfer function parameters can be selected to provide different adjustments (i.e., different adjustment values) at different positions for each axis of movement of each beam steering mechanism 50A, 50B. This capability is especially useful in obtaining a desired or optimal calibration over the entirety of the build surface 28.

The standard for comparison can vary depending on the specific application and intended result, such as the minimized average error or minimized error at selected control point described above. One example of a standard would be position and/or rotation of the scan field relative to the center 86 of the worksurface 28. It is also noted that the alignment standard can be absolute or relative. That is, the separate scan fields may be in complete alignment with each other but not necessarily in perfect alignment with a center 86 of the worksurface 28.

The calibration build pattern 66 described above to be used in various ways to calibrate the machine 10.

In one example, prior to production use of the machine 10, a calibration build pattern 66 may be completed and measured, a correction determined, the correction applied, and then the machine 10 may be used to build production components.

In another example, another calibration build pattern 66 may be carried out subsequent to applying the correction, to confirm that the correction was sufficient.

In another example, calibration build pattern 66 may be carried out at regular intervals, such as after a predetermined number of components are built, or after a certain number of layers are built for one component.

The method described herein has several advantages over the prior art. In particular, separate beam steering mechanisms can be measured to a common datum structure to achieve maximum accuracy of all systems across the scan field. Furthermore, variable artifact spacing permits minimizing error in specific regions without compromising overall inspection time.

The foregoing has described an apparatus and method for calibration of beam scan fields. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any claims, abstract and drawings), or to any novel one, or any novel combination, of the steps of any method or process so disclosed.

What is claimed is:

1. A method of calibrating beam scan fields for an additive manufacturing process in which two or more radiant energy beams (54, 56) are used to selectively fuse material to form a workpiece (25), the method comprising:
   directing the two or more radiant energy beams (54, 56) using individual beam steering mechanisms to create a calibration build pattern (66) on a substrate, the calibration build pattern (66) including at least one measurement artifact (70, 72) created by each of the two or more radiant energy beams (54, 56);
   measuring the position of the measurement artifacts (70, 72);
   comparing the measured position of the measurement artifacts (70, 72) to a standard to identify an alignment error; and
   adjusting at least one of the beam steering mechanisms to compensate for the alignment error;
   wherein the measurement artifacts (70, 72) are arranged in a plurality of measurement artifact groups (68), and the measurement artifact groups (68) have a variable spacing distance within the calibration build pattern (66).

2. The method of claim 1 wherein each beam steering mechanism is associated with a scan field, and the beam steering mechanisms are positioned such that the scan fields partially overlap each other.

3. The method of claim 1 wherein the step of adjusting includes minimizing an average alignment error of each beam steering apparatus.

4. The method of claim 1 wherein the step of adjusting includes minimizing the alignment error in a predetermined location of the calibration build pattern (66).

5. The method of claim 1 wherein each beam steering mechanism includes at least one galvanometer operable to steer a radiant energy beam in response to an input signal.

6. The method of claim 1 wherein the step of adjusting includes changing at least one parameter of a software transfer function used to transmit drive signals to the beam steering mechanism.

7. The method of claim 1 wherein:
   each beam steering mechanism is associated with a scan field, and
   the step of adjusting includes providing different adjustment values at different portions of the scan field for each beam steering mechanisms.

8. The method of claim 1 wherein the measurement artifacts (70, 72) are arranged in a plurality of measurement artifact groups (68), each measurement artifact group including a control point and including at least one measurement artifact formed by each of the radiant beams (54, 56).

9. The method of claim 1 wherein the calibration build pattern (66) includes a central area (67) surrounded by a boundary (69), the measurement artifacts (70, 72) are arranged in a plurality of measurement artifact groups (68), and the measurement artifact groups (68) have a relatively larger spacing within the central area (67) and a relatively smaller spacing near the boundary (69).

10. The method of claim 1 wherein the calibration build pattern (66) has a central area (67) surrounded by a boundary (69), the measurement artifacts (70, 72) are arranged in a plurality of measurement artifact groups (68), and the measurement artifact groups (68) have a smaller spacing in a preselected region within the central area (67).

11. The method of claim 1 wherein the step of measuring includes determining a position of at least one point lying on each of the measurement artifacts (70, 72).

12. The method of claim 1 wherein the material is a powder contained in a build chamber and the two or more energy beams are used to selectively fuse the powder in the build chamber in a layer-by-layer process to form the workpiece.

13. The method of claim 1 further comprising: using the calibrated additive manufacturing process to build one or more workpieces each including two or more layers.

14. The method of claim 13 further comprising: repeating the steps of creating a calibration build pattern, measuring the position of the measurement artifacts, comparing the measured position of the measurement artifacts to a standard, and adjusting at least one of the beam steering mechanisms, after a predetermined number of layers are built for one workpiece.

15. The method of claim 13 further comprising: repeating the steps of creating a calibration build pattern, measuring the position of the measurement artifacts, comparing the measured position of the measurement artifacts to a standard, and adjusting at least one of the beam steering mechanisms, after a predetermined number of workpieces are built.

16. The method of claim 1 further comprising: repeating the steps of creating a calibration build pattern, measuring the position of the measurement artifacts, and comparing the measured position of the measurement artifacts to a standard subsequent to adjusting at least one of the beam steering mechanisms, to confirm that a correction was sufficient.

17. The method of claim 1 wherein the standard includes at least one of a position or a rotation of a scan field relative to a center of a worksurface.

18. The method of claim 1 wherein the standard comprises an absolute position of a scan field.

19. The method of claim 1 wherein the standard comprises a relative position of two or more scan fields.

\* \* \* \* \*